United States Patent [19]

Hodapp et al.

[11] Patent Number: 5,333,559
[45] Date of Patent: Aug. 2, 1994

[54] ROW CROP CULTIVATOR AND SEEDING ATTACHMENT

[75] Inventors: Gary D. Hodapp, Mankato; James A. Johnson, Cologne; Vincent J. Tomlonovic, North Mankato, all of Minn.

[73] Assignee: Hiniker Company, Mankato, Minn.

[21] Appl. No.: 944,683

[22] Filed: Sep. 14, 1992

[51] Int. Cl.⁵ ............................................. A01C 5/00
[52] U.S. Cl. ................................. 111/152; 111/175
[58] Field of Search ............... 111/120, 124, 149, 152, 111/174, 175

[56] References Cited

U.S. PATENT DOCUMENTS

| | | | |
|---|---|---|---|
| 1,284,162 | 11/1918 | Tyson | 111/152 |
| 2,834,446 | 5/1958 | Wade | |
| 2,913,086 | 11/1959 | Wade | |
| 3,258,162 | 6/1966 | Beasley | 111/152 X |
| 4,048,929 | 9/1977 | Zumbahlen | |
| 4,373,455 | 2/1983 | Friggstad | 111/152 X |
| 4,461,355 | 7/1984 | Peterson et al. | 111/124 X |
| 4,601,248 | 7/1986 | Beasley | 111/52 |
| 4,674,419 | 6/1987 | Kopecky | 111/124 X |
| 4,683,826 | 8/1987 | Solie et al. | 111/124 |
| 4,834,189 | 5/1989 | Peterson et al. | |
| 5,161,472 | 11/1992 | Handy | |
| 5,163,954 | 8/1992 | Fetaz et al. | 111/152 X |

FOREIGN PATENT DOCUMENTS 1423023  9/1988  U.S.S.R. ............................ 111/152

Primary Examiner—Clifford D. Crowder
Assistant Examiner—Paul C. Lewis
Attorney, Agent, or Firm—Haugen and Nikolai

[57] ABSTRACT

A row crop cultivator is provided with a seed dispensing manifold attached to and spanning the lay shares forming a part of its middleworker assembly. The seed distribution manifold is designed to randomly distribute seeds fed into it from a towed planter assembly that includes a seed hopper, metering means for feeding out seeds from the hopper in accordance with the ground speed of the apparatus and a blower for forcing the seeds through suitable tubes to the seed distribution manifold.

4 Claims, 3 Drawing Sheets

ROW CROP CULTIVATOR AND SEEDING ATTACHMENT

BACKGROUND OF THE INVENTION

I. Field of the Invention

This invention relates generally to row crop cultivating equipment used in agriculture, and more specifically to a row crop cultivator including a seeding attachment whereby field cultivation and seeding of the soil can be accomplished during a single pass of the equipment.

II. Discussion of the Prior Art

In the Peterson et al. U.S. Pat. No. 4,834,189, there is disclosed an improved row crop cultivator especially designed for use in minimum tillage applications. That patent describes a system in which a plurality of ganged cultivating units are mounted on a toolbar which is adapted to be towed behind a tractor-type farm vehicle. Each cultivating unit or stage comprises a frame which is supported on a pair of spaced-apart gauge wheels. Also mounted on the frame for rotation within the gap between the gauge wheels is a disc-shaped coulter blade, which is configured to cut through crop residue and weed debris as the material being cut is held against the ground surface by the gauge wheels. Trailing directly behind the coulter blade is a middleworker comprising a narrow width shank depending from the frame and having a subsoil point member on its lower leading edge and wing-like shear blades flaring rearwardly and outwardly at a predetermined angle from the lower end of the shank. The middleworker designed in accordance with the Peterson patent provides accurate control over the depth beneath the ground surface at which the lay share blades travel. This adjustment is easily made using a wrench to rotate a threaded rod that is operatively disposed between the frame and a gauge wheel support arm.

Because of the accuracy with which the depth of penetration of the lay shares can be controlled, the addition of a seeding unit in accordance with the present invention converts the row crop cultivator to a seed planting implement, making it possible for the farmer to use the same equipment for cultivating row crops and for solid seeding other crops, such as soybeans. Because the cultivator unit offers excellent control over the depth of penetration, it can be used in virtually any field conditions. For example, it can be used in standing corn stalks, soybean stubble and wheat stubble. Moreover, when travelling between about four m.p.h. and seven m.p.h., the lay shares tend to throw up a "rooster-tail" of dirt as the seeds are being dispensed, allowing for a random pattern of distribution before being covering by the falling layer of dirt. It is known in the art to provide a seeding attachment to a field cultivator, but such a cultivator having a seeding attachment tends to deposit the seeds in row patterns, and because it tends to roll the dirt over rather than lifting it into a rooster-tail, the distribution is not random.

SUMMARY OF THE INVENTION

It is accordingly a principal object of the present invention to provide an apparatus for readily converting an existing row crop cultivator to an implement for random seeding such crops as soybeans, wheat, barley, milo, etc.

Another object of the invention is to provide a low-cost seed distribution device which attaches to and extends between the lay shares of the cultivator's middleworker.

Yet another object of the invention is to provide an attachment for a row crop cultivator which can be used to accurately deposit plant seeds in a random pattern at a uniform depth beneath covering soil and which minimizes the need for previous soil preparation of the seed bed.

The foregoing objects are achieved in accordance with the present invention by providing a seeding attachment for a row crop cultivator, the cultivator being of the type having a plurality of stages mounted on an agricultural toolbar to be pulled by a tractor where each stage includes a frame suspended from the toolbar and spring-biased downwardly therefrom. A pair of gauge wheels mounted in parallel, slightly spaced apart relation on a common, horizontally oriented axle supports the frame at a selectable elevation relative to the ground to be cultivated. The row crop cultivator further includes a coulter blade journaled for rotation on the frame aft of the axle on which the gauge wheels are mounted. The coulter wheel has a diameter such that a portion thereof extends into the gap between the gauge wheels. Also supported by the frame is a middleworker assembly comprising a downwardly extending shank having flared wing members on each side of its lower end and a subsoil point member attached to the lower leading edge of the shank forward of the flared wing members. A pair of detachable lay shares are secured to the flared wing members on the shank rearward of the point member. The lay share members of one stage extend rearwardly and outwardly toward the lay shares on an adjacent stage, leaving a predetermined gap between the cooperating ends of the lay shares.

The seed planting attachment comprises a generally triangular manifold member where the triangle has a base and two adjacent side edges. The side edges are attachable to the lay share members on a given stage so that the manifold member will ride beneath the soil surface as the lay share members lift the soil. Further, the manifold member has a plurality of seed distribution ports disposed along the base edge thereof as well as seed inlet ports in fluid communication with the plurality of seed distribution ports.

Pulled by the tractor and trailing behind the cultivator stages is a hopper having a seed metering and air delivery system. This apparatus introduces metered quantities of seed into the seed inlet ports of the manifold member. As the assembly is pulled across the field, the lay shares travel beneath the surface of the ground, throwing up a "rooster-tail" pattern of dirt while simultaneously dispensing seeds in a random pattern on the ground. As the lifted soil comes to rest, it provides covering for the seed of a generally uniform depth.

Use of the system of the present invention has resulted in a potential crop yield boost because the seeds are deposited onto a moist underlayer of ground as a canopy of earth falls on top of the seed bed to aid with moisture retention, weed control and erosion resistance. Because it is not necessary to prepare the seed bed as by tilling or plowing in advance, fuel savings result and, moreover, moisture and erosion control benefits are increased.

When it is considered that most farmers growing soybean, corn and other grain need to have a row crop cultivator in the first instance, with a modest addition in terms of cost, the seeding capability can be added to that unit, thus obviating the need to have a separate expensive planter or seed drill.

As is pointed out in the aforereferenced Peterson U.S. Pat. No. 4,834,189, an anhydrous ammonia fertilizer attachment can be added to the cultivator, providing the ability for the system to loosen the soil, deposit seed and add fertilizer with only a single pass of the equipment through the field.

DESCRIPTION OF THE DRAWINGS

The foregoing features, objects and advantages of the invention will become apparent to those skilled in the art from the following detailed description of a preferred embodiment, especially when considered with the accompanying drawings in which like numerals in the several views refer to corresponding parts.

DESCRIPTION OF THE PREFERRED EMBODIMENT

Figure 1:
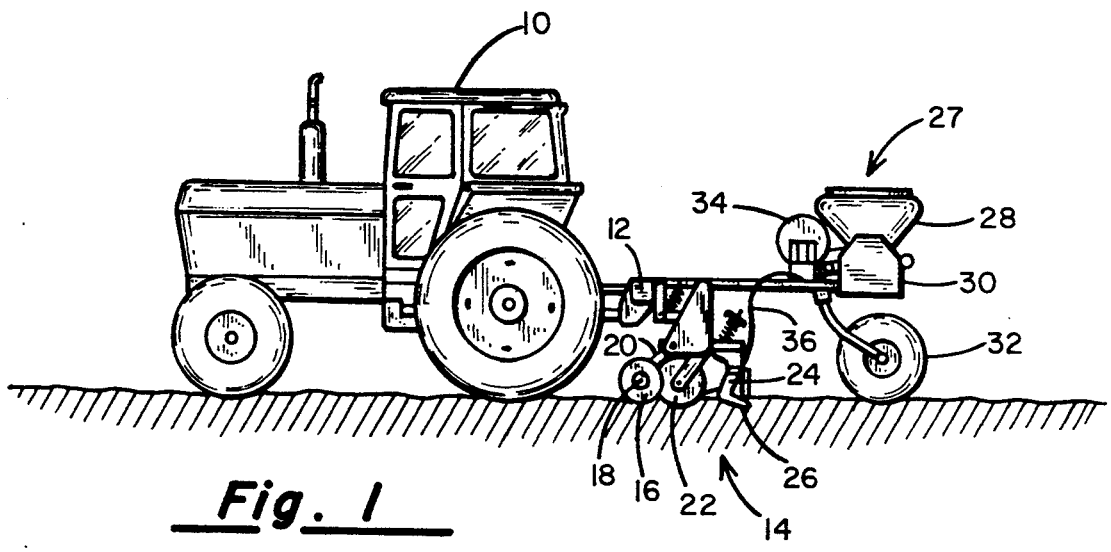
FIG. 1 is a side elevation of a tractor pulling the cultivator incorporating the seeding attachment in accordance with the present invention.

Referring first to FIG. 1, there is shown a tractor-type vehicle 10 attached to an agricultural toolbar 12 from which is suspended a plurality of row-crop cultivator stages, one of which is indicated generally by numeral 14. As will be more fully explained when the details of the cultivator stage are explained, it includes a pair of gauge wheels 16 which are journaled for rotation about a horizontal axle 18 on a pivotable arm 20. Disposed aft of the gauge wheels is a disc-shaped coulter blade 22 and trailing it is a soil-working implement, here illustrated as a middleworker 24. Flaring outwardly and rearwardly from the shank portion of the middleworker 24 are a pair of replaceable lay shares 26. While not visible in the view of FIG. 1, bolted to the lay shares and extending between them is a seed distribution manifold.

Also appropriately coupled to the toolbar 12 is a seed hopper 28 cooperating with a metering device 30 to drop seeds at a rate dependent upon the ground speed of the vehicle as measured by the ground-engaging wheel 32. The seeds are entrained in an airstream provided by a blower 34 driven by a hydraulic motor (not shown), with the seeds being blown through tubes as at 36 leading to the seed distribution manifold.

Figure 2:
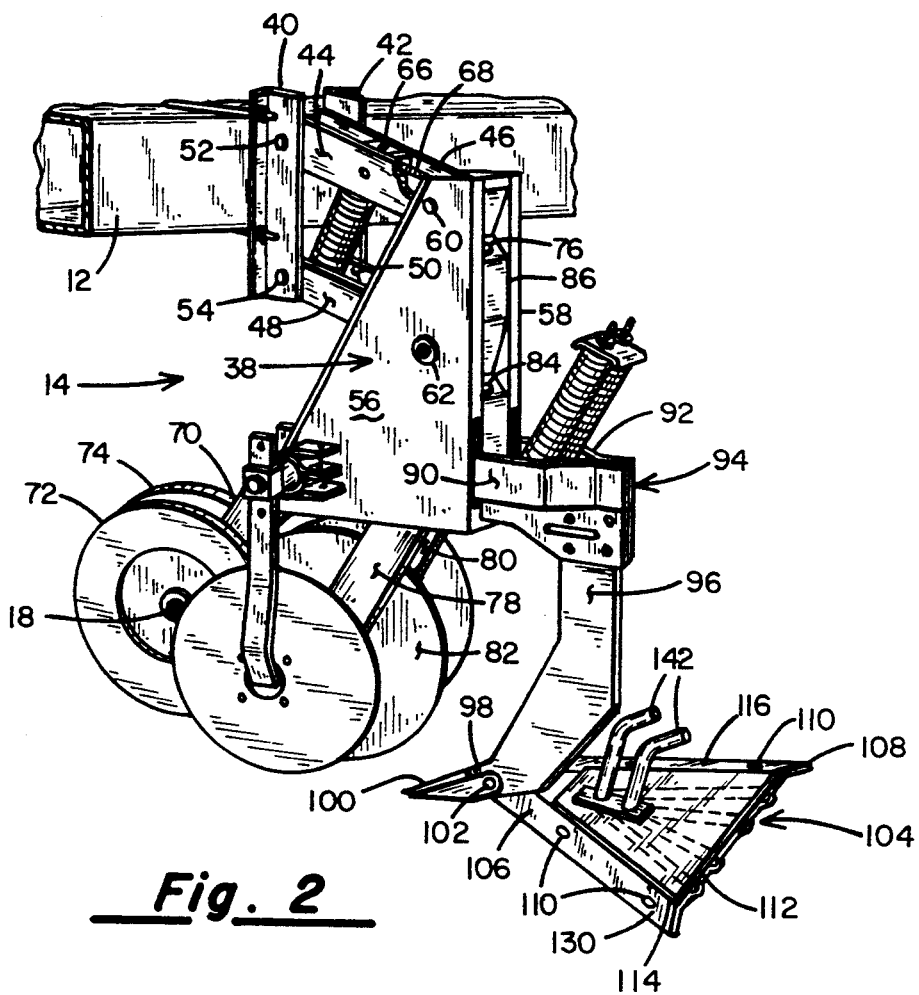
FIG. 2 is a close-up, perspective view of a single cultivator stage incorporating the seeding attachment of the present invention.

To better understand the constructional features of each of the row-crop cultivator stages attached to the toolbar 12, reference is next made to the perspective drawing of FIG. 2. The row crop cultivator, indicated generally by numeral 14, attaches to the toolbar 12 along with a predetermined number of substantially identical stages which are positioned at predetermined intervals along the length of the toolbar. As is explained in the aforereferenced Peterson et al. U.S. Pat. No. 4,834,189, the toolbar 12 is tubular and has a rectangular cross-section allowing ballast, such as concrete blocks, to be inserted therein for providing additional downweight if required.

The cultivator unit includes a frame, indicated generally by numeral 38, which includes first and second vertically oriented angle bars 40 and 42, to which are pivotally joined parallel linkage members 44–46 and 48–50. Disposed between the parallel linkage bars 44–46 is a first tubular spacer (not shown), and a bolt 52 passes through the angle bars 40 and 42 and through this spacer as a pivot connection. Similarly, a tubular spacer is disposed between the linkage bars 48–50 with bolt 54 passing through that spacer as well as through the support members 40 and 42 and the parallel linkage bars 48–50.

The frame 38 is also seen to include right and left mast plates 56 and 58, which are pivotally secured on opposed sides of the upper and lower parallel linkage pairs 44–46 and 48–50. More particularly, a first elongated bolt 60 is made to pass through the left mast plate 56, through the linkage bar 44, through a tubular spacer (not shown), through the linkage bar 46, and then through the right-hand mast plate 58. A nut (not shown) threaded onto this bolt holds it in place. In a similar fashion, a bolt 62 passes through the mast plates 56 and 58 and through the lower parallel linkage bars 48 and 50 to complete the parallelogram arrangement.

A heavy tension spring is affixed at its lower end to the spacer (not shown) through which the bolt 62 passes. The upper end of the spring, which is identified by numeral 64, is secured to a channel 66 slidably disposed between the parallel linkage arms 44 and 46. The slide channel 66 can be moved forward or rearward by using a wrench to engage a 1⅛ inch head on the end of a threaded rod 68 which cooperates with the slide, and this adjustment allows control over the amount of weight transferred from the toolbar 12 to the cultivator frame 38.

Vertically and adjustably supported between the right and left mast plates 56 and 58 is a gauge wheel support arm 70. Journaled at the lower end thereof is a pair of gauge wheels 72 and 74 which are oriented on a horizontal axle 18 and maintained in parallel, spaced-apart relation by a tubular spacer (not shown) positioned between the two wheels. As such, a predetermined gap exists between the two gauge wheels. Means are provided for adjusting the vertical distance between the axle 18 of the gauge wheels and the frame 38 by turning a threaded rod 76.

With continued reference to FIG. 2, there can be seen projecting down from the bottom of the mast plates 56 and 58 a bifurcated coulter support having spaced-apart legs 78 and 80 between which a stabilizing coulter blade 82 is journaled. The upper portion of the coulter supports 78 and 80 is adapted to fit between a pair of channel guides bolted between the mast plates 56 and 58. A threaded rod 84 cooperates with the guides and the coulter support to permit the raising and lowering of the coulter blade relative to the frame.

It is to be noted that the leading edge portion of the coulter blade 82 is centered in the gap between the trailing edges of the gauge wheels 72 and 74. This feature has been found to greatly improve the ability of the coulter blade 82 to cut through crop residues, weeds and other debris or trash normally encountered in minimum tillage agricultural practices.

Passing through bent flanges 86 and 88 formed along the rear edges of the mast plates 56 and 58 are bifurcated arms 90 and 92 of a middleworker support 94. Fastened to and projecting vertically down from the support 94 is the shank 96 of the middleworker assembly and it comprises a generally flat plate approximately 0.5 inches in thickness, and it is of a sufficient width to provide the necessary structural rigidity, given its intended purpose. The shank 96 projects vertically downward for a predetermined distance and then slopes downwardly and forwardly, terminating in a nose portion 98 to which is fastened a subsoil point member 100, the two being attached by a bolt 102. This subsoil point member 100 is preferably formed from a heat-treated material and is of a width greater than the thickness dimension of the shank 96 and, thus, provides an increase surface in contact with the ground. As will become more apparent hereinbelow, this feature is used to create an increased downward force on the entire frame assembly 38, much like the flukes on an anchor, as the tractor vehicle 10 (FIG. 1) pulls the ganged cultivator stages 14 across the field being cultivated.

Welded to each side surface of the lower edge portion of the shank 96 is a frog having rearwardly and outwardly sweeping wings, the frogs and the wings being hidden from view in FIG. 2 by the seed distribution manifold indicated generally by numeral 104. More particularly, there is attached to each of the aforementioned wings a replaceable lay share as at 106 and 108 which are held in place on the wings by means of bolts 110.

Figure 4:
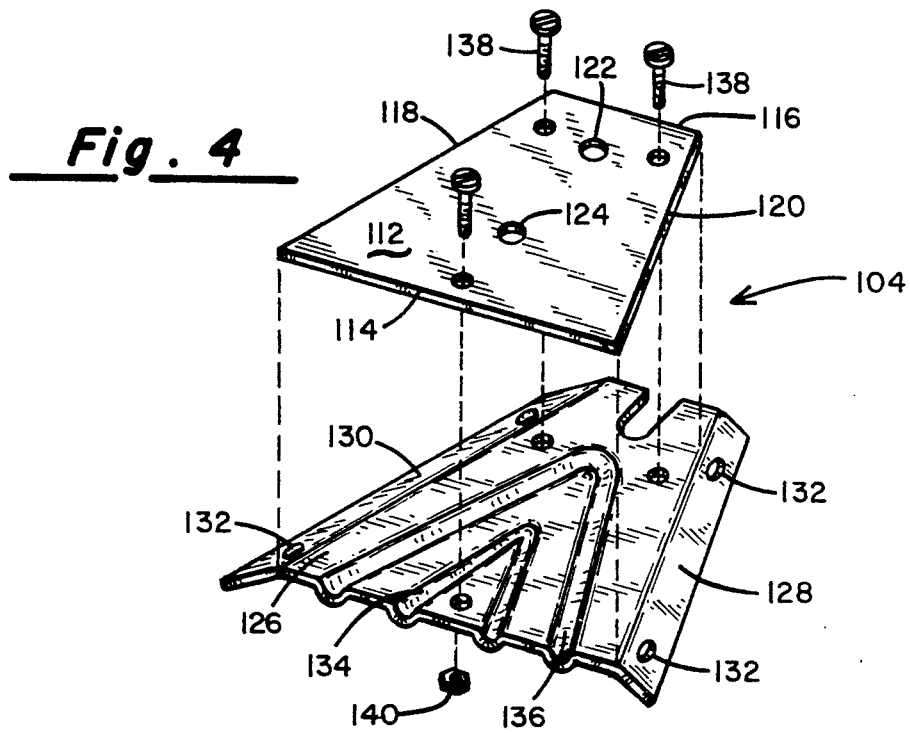
FIG. 4 is a blown-apart view of the seed distribution manifold.

With reference to the blown-apart view in FIG. 4, the seed distribution manifold comprises a cover plate 112, preferably formed from a suitable polymeric material, such as nylon, the cover plate being in the form of a trapezoid having a major base 114, a minor base 116 and two adjacent side edges 118 and 120. Formed through the thickness dimension of the cover plate 112 are first and second seed delivery ports 122 and 124. Underlaying the cover plate 112 is a sheet metal member 126 which is generally triangular but which includes downwardly depending, integrally formed flanges 128 and 130 which are adapted to abut the lay shares and be bolted thereto by the bolts 110 passing through the apertures 132 in the those flanges. Stamped into the baseplate 126 are U-shaped channels 134 and 136, which are arranged like chevrons, each having first and second segments intersecting at vertices, these vertices being aligned beneath the seed entry ports 122 and 124 on the cover plate 112.

With reference again to FIG. 2, attached to the upper surface of the cover plate 112 are tubular hose couplers 142. It is to these couplers 142 that the hoses like 36 in FIG. 1 attach. Thus, seeds from the hopper 28, metered out therefrom by the device 30 and carried by the airstream produced by blower 34, travel through the tube 36 and the couplers 142 to be deposited into the U-shaped channels and ultimately dispensed in a fashion which will be described with greater particularity below.

Figure 3:
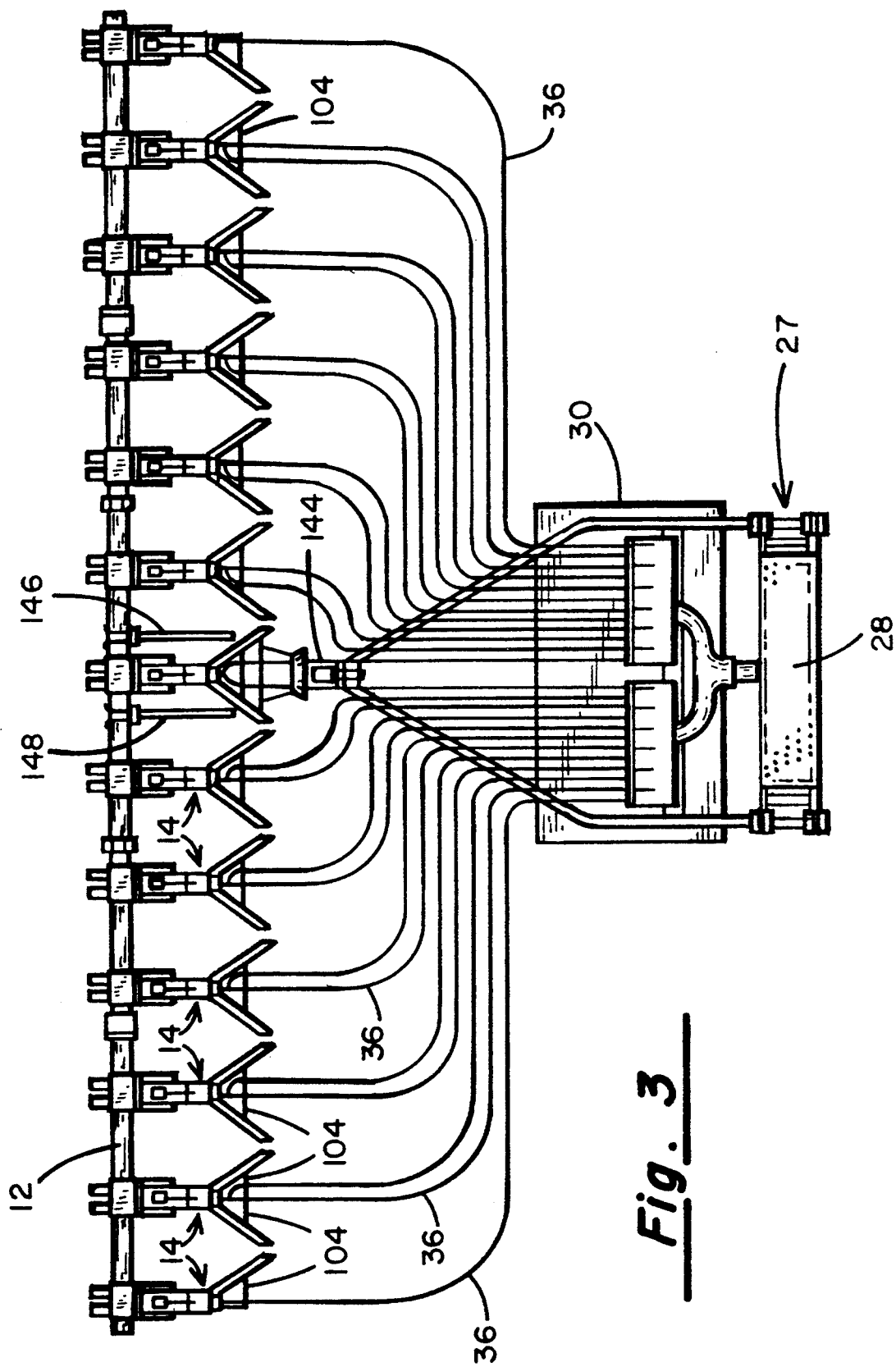
FIG. 3 is a plan view of a 12-row cultivator incorporating the seeding attachment of the present invention.

FIG. 3 is a somewhat schematic plan view illustrating a 12-row crop cultivator having a folding toolbar 12, and 13-row cultivator stages 14 affixed to it in the manner previously described. A suitable hitch 144 is used to couple the seed trailer 27 to the toolbar 12, by way of coupling arms 146 and 148. The hoses 36 are routed from the seed metering assembly 30 to the hose couplers 142 located on each of the seed distribution manifolds 104.

OPERATION

Figure 5:
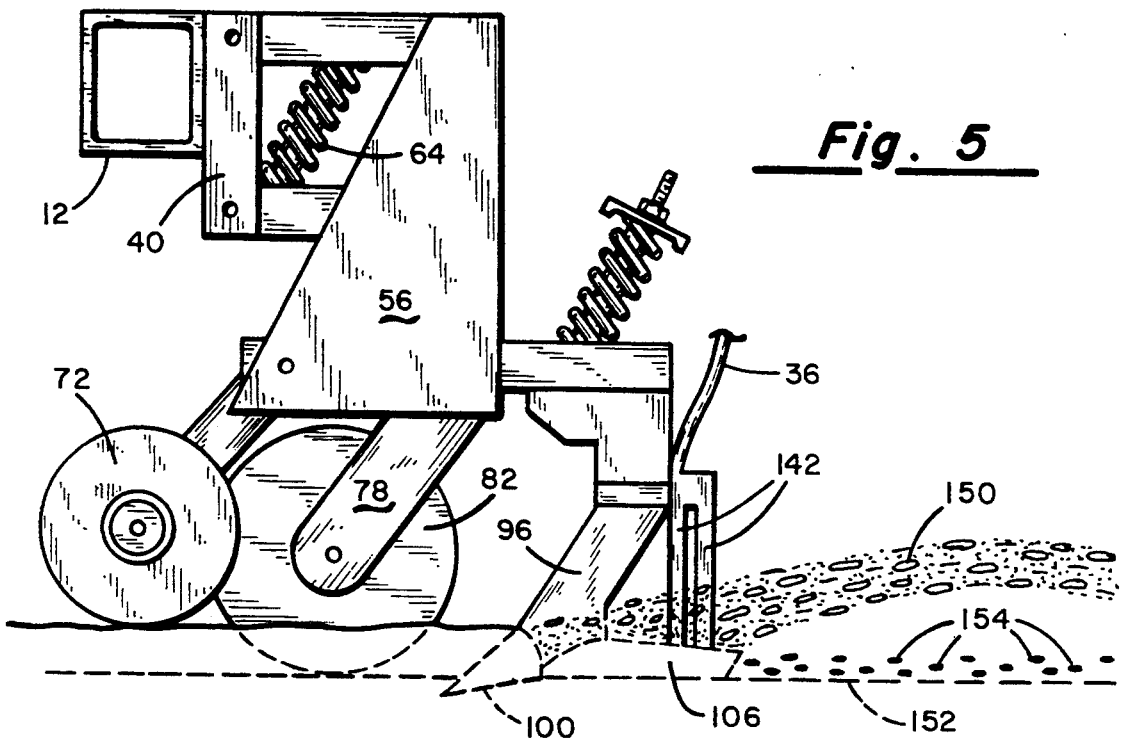
FIG. 5 is a schematic illustration showing the manner in which seeds are deposited from a cultivator stage designed in accordance with the present invention.

Considering now the operation, and with particular reference to FIG. 5 as the tractor 10 pulls the row crop cultivator across the field, the subsoil point member 100 on the middleworker shank 96 digs into the ground behind the coulter disc 82 to a depth established by the positioning of the gauge wheels 72. In the view of FIG. 5, the depth is illustrated as being two inches. When traveling at a speed of about five to seven miles-per-hour, the lay shares 106 and 108 toss up a "rooster-tail" of soil, indicated by numeral 150, while seeds conveyed through the hose 36 and the coupling tubes 142 enter the U-shaped channels formed in the baseplate 126 of the seed distribution manifold 104 and exit those channels along the major base edge 114 of the manifold so as to come to rest on the undisturbed subsoil layer 152. The seeds are identified by numeral 154 in FIG. 5. Because of the positioning of the exit ends of the channels formed in the seed distribution manifold, the seeds attain a random distribution on that ground surface before the covering layer of dirt 150 falls down on top of them to cover the seeds.

The apparatus of the present invention may be used to seed untilled fields, no-till fields, conventional residue-free seed beds or most anything in between. When sowing new seed in a field that had previously grown a row crop, such as corn, the old crop row is able to pass between adjacent lay shares which are gapped between adjacent stages by about three inches. There is no need to chop the stalks, and it is found that the standing residue leaves the ground less covered, permitting warmer and dryer seed beds without substantial wind loss of both soil and residue.

Because of the manner in which the coulter 82 is positioned relative to the gauge wheels, less "hair-pinning" of the weeds and residue occurs, which minimizes plugging of the middleworker by debris.

It is readily apparent that the seeding attachment may be attached to and removed from the row crop cultivator stages by merely removing the bolts that hold the flanges 130 and 132 of the seed distribution manifolds to the lay shares and disconnecting the hitch of the seed trailer from the toolbar. Moreover, and as has been explained in Peterson '189 patent, it is also possible to attach a fertilizer knife to the rear edge of the middleworker in the fashion described in another Peterson patent, U.S. Pat. No. 4,560,011, so that the soil can be fertilized either during a cultivating operation or during the seeding operation.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In combination with a row crop cultivator of the type having a plurality of stages mounted on an agricultural tool bar to be pulled by a tractor, each stage including a frame suspended from said tool bar and spring biased downwardly therefrom, a pair of gauge wheels mounted in slightly spaced-apart relation to define a gap therebetween, said gauge wheels being on at least one rotational axle for supporting said frame at a selectable elevation relative to the ground and a soil-treating implement suspended from said frame by a shank having opposed side surfaces and located aft of and aligned with said gap between gauge wheels, said soil-treating implement including a sweep with first and second lay shares attached to said shank and flaring outwardly and rearwardly from opposing side surfaces of said shank;

(a) a seed delivery manifold attached to and positioned between said first and second lay shares of said sweeps on said plurality of stages, said seed-delivery manifolds, each including (i) a generally triangular plate having a base and first and second adjacent sides, said sides flaring outwardly and rearwardly for abutting said lay shares, said plate having at least first and second channels extending at an angle to one another from said base to intersect at a point inward of said base; and (ii) a planar cover plate attached to said triangular plate in covering relation relative to said first and second channels, said cover plate including a first aperture overlaying said point of intersection for receiving a stream of seeds therethrough.

2. The combination as in claim 1 and further including at least two additional channels extending at an angle to one another from said base to intersect at a point inward of said base and offset from said point of intersection of said first and second channels, said cover plate including a second aperture overlaying said point of intersection of said two additional channels.

3. The combination as in claim 1 and further including:

(a) a seed hopper disposed aft of said cultivator stages and including means for metering seeds in relation to the ground speed at which said stages are being pulled and tubing means coupled between said metering means and said first aperture in said cover plate for conveying seeds from said metering means into said first and second U-shaped channels in an air stream having a predetermined velocity.

4. In combination with a row crop cultivator of the type having a plurality of stages mounted on an agricultural tool bar to be pulled by a tractor, each stage including a frame suspended from said tool bar and spring-biased downwardly therefrom, a pair of gauge wheels mounted in slightly spaced-apart relation creating a gap therebetween, said gauge wheels being journaled on an axle for supporting said frame at a selectable elevation relative to the ground to be cultivated, a coulter blade journaled for rotation on said frame aft of said axle on which said gauge wheels are mounted, said coulter having a diameter such that a portion thereof extends into said gap between said gauge wheels, and a middle worker assembly suspended from said frame by a shank, said shank having opposed sides and upper and lower ends with flared wing members on each of said sides at said lower end thereof, said middle worker assembly including a point member attached proximate the lower end of said shank forward of said flared wing members and a pair of detachable lay share members secured to said flared wing members on said shank rearward of said point member, the lay share members of one stage extending rearwardly and outwardly toward the lay share members on an adjacent stage leaving a predetermined gap therebetween, a seed planting attachment comprising:

(a) a generally triangular manifold member including a generally triangular metal sheet having a base and two adjacent side edges, said side edges being attachable to said lay share members on a given stage, said metal sheet having a plurality of intersecting first and second channels formed therein and forming a chevron pattern; and (b) a cover plate affixed to said metal sheet covering said channels, said cover plate including a plurality of seed inlet ports individually communicating with said first and second channels at their points of intersection, said manifold member riding beneath the soil surface as said lay share members lift, without turning, the soil, said manifold member having a plurality of seed distribution ports disposed along said base, said seed inlet ports being in fluid communication with said plurality of seed distribution ports, and means for introducing metered quantities of seed in an air stream of a predetermined velocity and flow rate into said seed inlet ports, whereby seeds projected out from said plurality of seed distribution ports are randomly distributed beneath the lifted soil as said middle worker assembly is drawn through the soil being cultivated.

* * * * *